(12) United States Patent
Wyerman et al.

(10) Patent No.: US 8,590,669 B2
(45) Date of Patent: *Nov. 26, 2013

(54) SOUND ATTENUATING DEVICE USING AN EMBEDDED LAYER FOR ACOUSTICAL TUNING

(71) Applicant: Janesville Acoustics, Milan, OH (US)

(72) Inventors: Barry Wyerman, Novi, MI (US); Michael Sargent, Northville, MI (US); Chuck Zupan, Macomb Township, MI (US)

(73) Assignee: Janesville Acoustics, Milan, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/841,403

(22) Filed: Mar. 15, 2013

(65) Prior Publication Data

US 2013/0199871 A1    Aug. 8, 2013

Related U.S. Application Data

(63) Continuation of application No. 13/350,075, filed on Jan. 13, 2012, now Pat. No. 8,418,806.

(51) Int. Cl.
*E04B 1/82* (2006.01)

(52) U.S. Cl.
USPC .................................. 181/290; 181/284

(58) Field of Classification Search
USPC .................................. 181/290, 284
See application file for complete search history.

(56) References Cited

U.S. PATENT DOCUMENTS

| | | | | |
|---|---|---|---|---|
| 4,130,175 A * | 12/1978 | Hehmann | | 181/290 |
| 6,808,786 B2 * | 10/2004 | Theiss | | 428/95 |
| 6,949,588 B2 * | 9/2005 | Park | | 521/79 |
| RE39,010 E * | 3/2006 | Gish et al. | | 181/290 |
| 7,055,649 B2 * | 6/2006 | Tompson et al. | | 181/290 |
| 7,080,712 B2 * | 7/2006 | Tsuiki et al. | | 181/204 |
| 7,105,069 B2 * | 9/2006 | Allison et al. | | 156/72 |
| 7,137,477 B2 * | 11/2006 | Keller et al. | | 181/286 |
| 7,201,253 B2 * | 4/2007 | Duval et al. | | 181/204 |
| 7,279,214 B2 * | 10/2007 | Nicolai et al. | | 428/137 |
| 7,320,739 B2 * | 1/2008 | Thompson et al. | | 156/308.2 |
| 7,322,440 B2 * | 1/2008 | Khan et al. | | 181/286 |
| 7,537,818 B2 * | 5/2009 | Allison et al. | | 428/95 |
| 7,658,984 B2 * | 2/2010 | Allison et al. | | 428/95 |
| 7,682,681 B2 * | 3/2010 | Allison et al. | | 428/95 |
| 7,690,480 B2 * | 4/2010 | Mori et al. | | 181/290 |
| 7,731,878 B2 * | 6/2010 | Wood | | 264/156 |
| 8,418,806 B1 * | 4/2013 | Wyerman | | 181/290 |

\* cited by examiner

*Primary Examiner* — Forrest M Phillips
(74) *Attorney, Agent, or Firm* — Miles & Stockbridge PC; David R. Schaffer, Esq.

(57) ABSTRACT

The present invention includes a layered acoustical system for sound attenuation in a vehicle including an external decorative layer; a moldable fiber backer adhesively adhered to a back side of the decorative layer, the moldable fiber backer further including an engineered fiber blend including one or more types of thermoplastic fibers and having a first density; a moldable lofted sound absorber and vibration decoupling layer including being made from another engineered fiber blend including one or more types of thermoplastic fibers and having a second density that is less than the first density of the moldable backer, a top side of the vibration decoupling layer being adhesively adhered to the second side of the moldable fiber backer; and an intermediate layer embedded in a location within the vibration decoupling layer to achieve a balance point between transmission loss and sound absorption.

20 Claims, 2 Drawing Sheets

SOUND ATTENUATING DEVICE USING AN EMBEDDED LAYER FOR ACOUSTICAL TUNING

FIELD OF THE INVENTION

This invention relates to molded structural acoustical parts. More specifically, the invention relates to a sound attenuating device having an embedded layer for acoustical tuning for use in a vehicle.

SUMMARY

The invention describes a tunable, layered acoustical system for sound attenuation in a vehicle including an external decorative layer that can be tufted or needled; a moldable fiber backer including a first side and a second side, the first side of the moldable fiber backer being adhesively adhered to a back side of the external decorative layer, the moldable fiber backer further including an engineered fiber blend including one or more types of thermoplastic fibers, the moldable fiber backer having a first surface density; a moldable lofted sound absorber and vibration decoupling layer including a top side and a bottom side and being made from the same or another engineered fiber blend including one or more types of thermoplastic fibers, the moldable lofted sound absorber and vibration decoupling layer having a second surface density that is less than the first surface density of the moldable backer, the top side of the moldable lofted sound absorber and vibration decoupling layer being adhesively adhered to the second side of the moldable fiber backer; and an intermediate layer embedded in and adhered to a location within the moldable lofted sound absorber and vibration decoupling layer to achieve a balance point between transmission loss and sound absorption.

BRIEF DESCRIPTION OF THE DRAWINGS

The accompanying drawings, which are incorporated in and constitute a part of this specification, illustrate embodiments of the invention. The invention will be best understood by reading the ensuing specification in conjunction with the drawings, in which same numbered elements are identical.

Embodiments will hereinafter be described in detail below with reference to the accompanying drawings, wherein like reference numerals represent like elements. The accompanying drawings have not necessarily been drawn to scale. For example, tilt angles and feature sizes may be exaggerated in the figures. Where applicable, some features may not be illustrated to assist in the description of underlying features.

DETAILED DESCRIPTION

Figure 1:
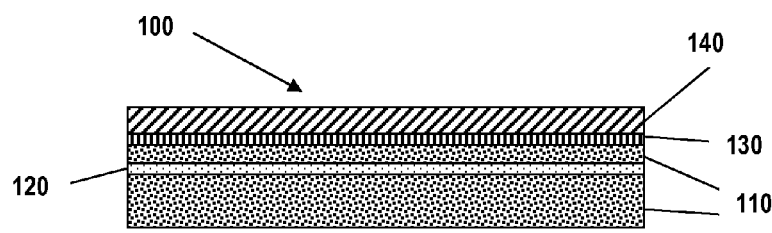
FIG. 1 is a cross-sectional, side view of a sound attenuating device having an acoustical perforated film layer embedded in a decoupling layer, in accordance with one or more embodiments of the present invention.

In the following detailed description, numerous specific details are set forth in order to provide a thorough understanding of the disclosed subject matter. However, it will be understood by those of ordinary skill in the art that the present invention may be practiced without these specific details. In other instances, well-known methods, procedures and components may not have been described in detail so as not to obscure aspects of the disclosed subject matter.

Embodiments of the present invention are directed generally to a sound attenuating device having an embedded layer. In particular, embodiments of the present invention relate to a sound attenuating device having an embedded acoustical layer. As used herein, the phrase "various embodiments" is intended to mean an embodiment, at least one embodiment, some embodiments, and/or all embodiments without limitation.

The present invention includes (i.e., comprises) a tunable, multi-layer, sound attenuating device having a separate thickness and density for each layer so that the device functions to achieve a balance point between transmission loss and sound absorption for use in the transportation industry, for example, but not limited to, as a passenger compartment carpet in automobiles or a dash insulator, generally, without a decorative layer. In accordance with at least one embodiment of the present invention, a first, or top, layer of the device is a decorative layer that can be tufted or needled, for example, a non-tufted and un-backed carpet having a thickness of about 5 mm, a weight of about 19 oz and an airflow resistance of about 80 Rayls ($N \cdot m^{-3}$ s). A second, or backer or cap, layer of the device is a moldable backer layer having, for example, a surface density of approximately 807 gsm, a thickness of approximately 3 mm and an air flow resistance (AFR) of approximately 400 Rayls. The moldable backer layer is located below the first layer and a top surface/side of the moldable backer layer is adhesively adhered to a bottom layer/side of the first layer. A third, or decoupling, layer of the device is a moldable lofted sound absorber and vibration decoupling layer having, for example, a surface density of approximately 1610 gsm, a thickness of approximately 3 to 30 mm and an AFR of approximately 490 Rayls. In various embodiments of the present invention, the moldable lofted sound absorber and vibration decoupling layer may have embedded within it an intermediate acoustical layer. The embedded intermediate acoustical layer can include, but is not limited to, a perforated film layer, an unperforated film layer, a scrim layer, or a paper layer. The perforated film layer may have, for example, a thickness of approximately 0.5 mm, multiple approximately 380 micron (µ) diameter and substantially circular perforations in the two-dimensional (i.e., the unmolded) configuration with a hole density of approximately 30 holes/$in^2$, an AFR of 900 Rayls, and be constructed of one or more layers of polyamide, polyethylene, polyethylene terephthalate (PET) and/or polypropylene. The shape of the perforations may be different after the device is molded to fit the desired vehicle configuration. For example, they may be elongated, curved, oval, reduced in diameter, etc., depending on the extent of the molding performed at each perforation location. The perforations may also be sized between 200µ and 500µ. The scrim layer may include a third fiber blend having, for example, a surface density of 90 gsm, a thickness of approximately 0.3 mm and an AFR of approximately 2000 Rayls.

Dissipative fiber systems, in accordance with one or more embodiments of the present invention, have improved either absorption or insertion loss in the critical 800 Hz range—as identified in vehicle road tests. Several of the systems showed tradeoffs between absorption and transmission loss (TL) and, in general, it was discovered that higher absorption comes with lower TL, but the frequency spectrum at issue must be examined in order to select a system that works best in the vehicle. Tuning of the system can be accomplished by changes in the fiber cap, the acoustical control layer and the fiber decoupler.

A layered construction for sound attenuation in a vehicle includes an external decorative layer (e.g., a carpet layer); a moldable backer for the decorative layer made from an engineered fiber blend including one or more types of thermoplastic fibers; a moldable lofted layer acting as a combined sound absorber and vibration decoupler made from an engineered fiber blend including one or more types of thermoplastic fibers; an intermediate layer that can be embedded at multiple locations in the construction for acoustical tuning The intermediate layer can be a perforated membrane or film, an impermeable membrane or film, or an acoustical control layer with preferred air flow control properties.

The type of film, the perforations, and the location of the film within any layer are selected to provide a balance between the sound absorption coefficient and the transmission loss for the construction. Both of these properties are critical to sound attention in a vehicle. The construction can also be used without a decorative layer when the surface is not visible (e.g., under dash insulator). The construction provides sound attenuation equivalent to higher mass barrier systems while providing weight saving for fuel economy and more efficient installation.

Additional design features can include: a control layer embedded within one or more of the fiber layers and not only used to separate dissimilar layers, for example, but not limited to, one or more layers within the decoupling layer, one or more layers in the backer layer, and/or one or more layers in at least two of the decoupling layer, and the backer layer; a perforated film as the control layer where performance is defined by film thickness, perforation size, and % open area; an AFR layer as the control layer—also embedded within one or more of the fiber layers; a perforated film or AFR layer as the embedded control layer where performance is controlled by preferential placement at different depths within the fiber layers; a film made of 3 or more layers that can be easily perforated prior to assembly with a hole size critical to the required performance and that is integral to the assembly; multiple fiber layers used for the moldable backer and that are in contact with both sides of the control layer; a special fiber blend for the moldable backer chosen for improved sound absorption over a standard fiber blend; a special fiber blend for the lofted vibration decoupler (i.e., the decoupling layer) chosen for improved sound absorption and transmission loss over a standard fiber blend; and a product design that provides a required TL without further compromising TL.

FIG. 1 is a cross-sectional, side view of a sound attenuating device having an acoustical perforated film layer embedded in a decoupling layer, in accordance with one or more embodiments of the present invention. In FIG. 1, a sound attenuating device 100 is shown to include a moldable decoupling layer (i.e., a decoupler) 110, for example, acting as a lofted sound absorber and vibration decoupling layer 110, which can be between 5 and 30 mm thick and be made of a moldable fiber blend. Embedded within the moldable decoupling layer 110 is seen an acoustical control layer 120, which is a perforated film layer 120. In general, the acoustical control layer 120 is positioned in the moldable decoupling layer 110 between ½ and ⅔ the way above a bottom side of the moldable decoupling layer 110. A top side of the moldable decoupling layer 110 is attached to a bottom side of a moldable backer 130 or cap layer 130, which in turn has top side attached to a bottom side of a decorative layer 140. Attachment of the layers may be accomplished using adhesive, needling, heat bonding, etc., as well as any combination thereof.

Figure 2:
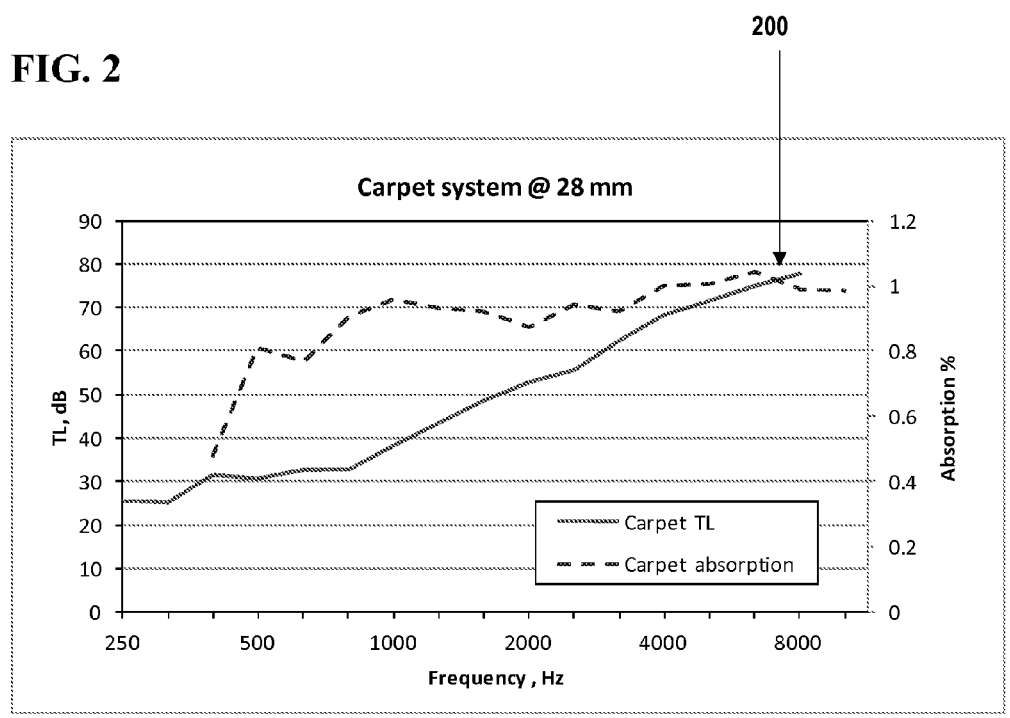
FIG. 2 is a graph showing the transmission loss and sound absorption of the sound attenuating device of FIG. 1.

FIG. 2 is a graph showing the insertion loss and sound absorption of the sound attenuating device of FIG. 1. As seen in FIG. 2, a point of maximum transmission loss and maximum sound absorption 200 for the device in FIG. 1 is shown in the top right of the graph in FIG. 2. The transmission loss and sound absorption at each frequency is also critical to the overall performance.

Figure 3:
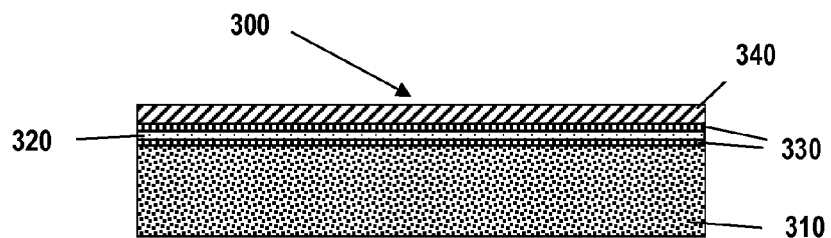
FIG. 3 a cross-sectional, side view of a sound attenuating device having an acoustical perforated film layer embedded in a cap or moldable backer layer, in accordance with one or more embodiments of the present invention.

FIG. 3 a cross-sectional, side view of a sound attenuating device having an acoustical perforated film layer embedded in a cap or moldable backer layer, in accordance with one or more embodiments of the present invention. In FIG. 3, a sound attenuating device 300 is shown to include a moldable decoupling layer (decoupler) 310, for example, a moldable lofted sound absorber and decoupling layer 310, which can be between 5 and 30 mm thick and be made of a moldable fiber blend, a moldable backer or cap layer 330, an acoustical control layer 320 and a decorative layer 340. Embedded within the moldable backer layer 330 is the acoustical control layer 320, which is a perforated film layer 320. In general, the acoustical control layer 320 will be positioned in the moldable backer layer 330 between ½ and ⅔ above a bottom side of the moldable backer layer 330. A top side of the moldable decoupling layer 310 is attached to a bottom side of a moldable backer or cap layer 330, which in turn has a top side attached to a bottom side of the decorative layer 340. Attachment of the layers may be accomplished using adhesive, needling, heat bonding, etc., as well as any combination thereof.

Figure 4:
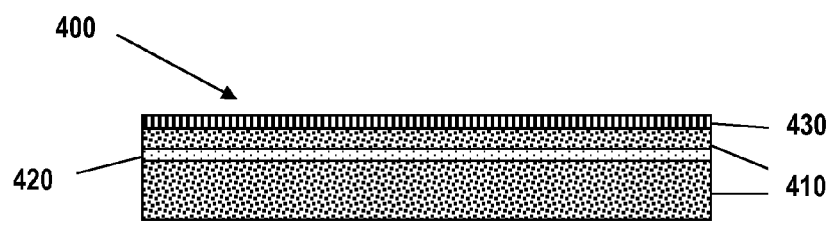
FIG. 4 is a cross-sectional, side view of a sound attenuating device having an acoustical perforated film layer embedded in a decoupling layer as in FIG. 1 a but without a top decorative layer, in accordance with one or more embodiments of the present invention.

FIG. 4 is a cross-sectional, side view of a sound attenuating device 400 having an acoustical perforated film layer 420 embedded in a decoupling layer 410 as in FIG. 1 but without a top decorative layer, in accordance with one or more embodiments of the present invention. A top side of the decoupling layer 410 is attached to a bottom side of a moldable cap layer 430. Although not shown in any figures, the other embodiments shown and/or described herein may also have alternate versions without the decorative layer.

Other embodiments are also contemplated to include in one embodiment an AFR scrim layer embedded in the cap portion (i.e., the moldable backer layer), a needled film in the cap portion, an AFR scrim layer between the decorative and moldable backer layers.

In accordance with one or more embodiments of the present invention a layered acoustical system for sound attenuation in a vehicle includes an external decorative layer; a moldable fiber backer including a first side and a second side, the first side of the moldable fiber backer being adhesively adhered to a back side of the decorative layer, the moldable fiber backer further including an engineered fiber blend including one or more types of thermoplastic fibers, the moldable fiber backer having a first density; a moldable lofted sound absorber and vibration decoupling layer including a top side and a bottom side and being made from the same or another engineered fiber blend including one or more types of thermoplastic fibers, the moldable lofted sound absorber and vibration decoupling layer having a second density that is less than the first density of the moldable backer, the top side of the moldable lofted sound absorber and vibration decoupling layer being adhesively adhered to the second side of the moldable fiber backer; and an intermediate layer embedded in a location within the moldable lofted sound absorber and vibration decoupling layer to achieve a balance point between transmission loss and sound absorption.

In accordance with one or more embodiments of the present invention a layered acoustical system for sound attenuation in a vehicle includes a moldable fiber cap layer including a first side and a second side, the first side of the moldable fiber cap layer being uncovered; the moldable fiber cap layer further including an engineered fiber blend including one or more types of thermoplastic fibers, the moldable fiber cap layer having a first density; a moldable lofted sound absorber and vibration decoupling layer including a top side and a bottom side and being made from the same or another engineered fiber blend including one or more types of thermoplastic fibers, the moldable lofted sound absorber and vibration decoupling layer having a second density that is less than the first density of the moldable fiber cap layer, the top side of the moldable lofted sound absorber and vibration decoupling layer being adhesively adhered to the second side of the moldable fiber cap layer; and an intermediate layer embedded in and adhered to a location within the moldable lofted sound absorber and vibration decoupling layer to achieve a balance point between transmission loss and sound absorption.

In accordance with one or more embodiments of the present invention, a layered acoustical system for sound attenuation in a vehicle includes: an external, decorative layer; a moldable fiber backer including a first side and a second side, the first side of the moldable fiber backer being adhesively adhered to a back side of the external, decorative layer, the moldable fiber backer further including an engineered fiber blend including one or more types of thermoplastic fibers, the moldable fiber backer having a thickness of about 3 mm and a surface density of about 807 gsm; a moldable lofted sound absorber and vibration decoupling layer including a top side and a bottom side and being made from another engineered fiber blend including one or more types of thermoplastic fibers, the moldable lofted sound absorber and vibration decoupling layer having a thickness in the range of from 3 to 30 mm and a surface density of about 1610 gsm, the top side of the moldable lofted sound absorber and vibration decoupling layer being adhesively adhered to the second side of the moldable fiber backer; the external, decorative layer, the moldable fiber backer and the moldable lofted sound absorber and vibration decoupling layer having a balance between sound absorption and transmission loss; and a perforated film layer including a heat activated adhesive on opposite sides of the perforated film layer, the perforated layer having a thickness of about 0.5 mm, a plurality of perforations each having a diameter of about 380μ, a hole density of about 30 holes/in$^2$, and an airflow resistance of approximately 900 Rayls, the perforated layer being embedded in and adhered to a location within the decoupling layer, the layered acoustical system being constructed to achieve a balance between sound absorption and transmission loss. The layered acoustical system for sound attenuation wherein the perforated film layer in the decoupling layer is located at a level about ½ to ⅓ the thickness of the decoupling layer away from the first side of the decoupling layer.

While the present invention has been described in conjunction with a number of embodiments, the invention is not to be limited to the description of the embodiments contained herein. It is further evident that many alternatives, modifications, and variations would be or are apparent to those of ordinary skill in the applicable arts. Accordingly, all such alternatives, modifications, equivalents, and variations that are within the spirit and scope of this invention are included.

What is claimed is:

1. A layered acoustical system for sound attenuation in a vehicle comprising:

an external decorative layer;
a moldable fiber backer having a first density and a first side of the moldable fiber backer being adhered to a back side of the external decorative layer, the moldable fiber backer further including a first engineered fiber blend including thermoplastic fibers;
a moldable lofted sound absorber and vibration decoupling layer being made from a second engineered fiber blend including thermoplastic fibers, the moldable lofted sound absorber and vibration decoupling layer having a second density that is less than the first density of the moldable backer, a top side of the moldable lofted sound absorber and vibration decoupling layer being adhered to a second side of the moldable fiber backer; and
an intermediate layer embedded in and adhered to a location within the moldable lofted sound absorber and vibration decoupling layer to achieve a balance point between transmission loss and sound absorption.

2. The layered acoustical system of claim 1 wherein the decorative layer is a tufted carpet, a needled non-woven carpet, or a nonwoven carpet with a thickness of approximately 5 mm, and an airflow resistance of approximately 80 Rayls.

3. The layered acoustical system of claim 1 wherein the intermediate layer is an acoustical control layer including a perforated membrane or film that comprises at least one layer, an impermeable membrane, or an airflow resistance layer with preferred air flow control properties comprising a third fiber blend having a density of approximately 90 gsm, a thickness of approximately 0.3 mm, and an airflow resistance of approximately 2000 Rayls.

4. The layered acoustical system of claim 1 wherein the intermediate layer is a perforated film layer made of polyamide and polyethylene and having an unmolded thickness of approximately 0.5 mm, a plurality of approximately 380 μ diameter substantially circular perforations, a hole density of approximately 30 holes/in$^2$, and an airflow resistance of approximately 900 Rayls.

5. The layered acoustical system of claim 1 wherein the moldable fiber backer has a surface density of approximately 807 gsm, a thickness of approximately 3 mm, and an airflow resistance of approximately 400 Rayls.

6. The layered acoustical system of claim 1 wherein the moldable lofted sound absorber and vibration decoupling layer has a surface density of approximately 1610 gsm, a thickness in the range of approximately 3 mm to approximately 30 mm, and an airflow resistance of approximately 490 Rayls at 30 mm.

7. The layered acoustical system of claim 1 wherein the location of the perforated film layer in the moldable lofted sound absorber and vibration decoupling layer is at a level about ½ to ⅓ the thickness of the moldable lofted sound absorber and vibration decoupling layer away from the top side of the moldable lofted sound absorber and vibration decoupling layer.

8. The layered acoustical system of claim 1 further comprising a second perforated film layer embedded in and adhered to a location within the moldable backer, the layered acoustical system still constructed to achieve a new balance point between transmission loss and sound absorption.

9. The layered acoustical system of claim 3 wherein the location of the air flow resistance layer in the moldable lofted sound absorber and vibration decoupling layer is at a level about ⅓ the thickness of the moldable lofted sound absorber and vibration decoupling layer away from the top side of the moldable lofted sound absorber and vibration decoupling layer.

10. The layered acoustical system of claim 1 further comprising an air flow resistance layer embedded in and adhered to a location within the moldable backer, the layered acoustical system still constructed to achieve a new balance point between transmission loss and sound absorption.

11. The layered acoustical system of claim 1 further comprising a second air flow resistance layer embedded in and adhered to a location within the moldable backer, the layered acoustical system constructed to achieve a new balance point between transmission loss and sound absorption.

12. The layered acoustical system of claim 1 further comprising an impermeable membrane layer embedded in and adhered to a location within the moldable backer, the layered acoustical system still constructed to achieve a new balance point between transmission loss and sound absorption.

13. A layered acoustical system for sound attenuation in a vehicle comprising:
   a moldable fiber cap layer including a first side of the moldable fiber cap layer being uncovered, the moldable fiber cap layer further including an engineered fiber blend of thermoplastic fibers, the moldable fiber cap layer having a first density;
   a moldable lofted sound absorber and vibration decoupling layer made from another engineered fiber blend of thermoplastic fibers, the moldable lofted sound absorber and vibration decoupling layer having a second density that is less than the first density of the moldable fiber cap layer, a top side of the moldable lofted sound absorber and vibration decoupling layer being adhered to a second side of the moldable fiber cap layer; and
   an intermediate layer embedded in and adhered to a location within a single layer of the layered acoustical system to achieve a balance point between transmission loss and sound absorption.

14. The layered acoustical system of claim 13 wherein the location of the intermediate layer is in the moldable lofted sound absorber and vibration decoupling layer.

15. The layered acoustical system of claim 14 wherein the location of the intermediate layer in the moldable lofted sound absorber and vibration decoupling layer is at a level about ½ to ⅓ the thickness of the moldable lofted sound absorber and vibration decoupling layer away from the top side of the moldable lofted sound absorber and vibration decoupling layer.

16. The layered acoustical system of claim 13 wherein the location of the intermediate layer is in the moldable fiber cap layer.

17. The layered acoustical system of claim 13 wherein the embedded intermediate layer is a perforated membrane or film, an impermeable membrane, or an acoustical control layer with preferred air flow control properties.

18. A layered acoustical system for sound attenuation in a vehicle comprising:
   an external decorative layer;
   a moldable fiber backer including a first side of the moldable fiber backer being adhered to a back side of the external, non-tufted and un-backed decorative layer, the moldable fiber backer further including an engineered fiber blend of thermoplastic fibers, the moldable fiber backer having a thickness of about 3 mm and a density of about 807 gsm;
   a moldable lofted sound absorber and vibration decoupling layer being made from another engineered fiber blend of thermoplastic fibers, the moldable lofted sound absorber and vibration decoupling layer having a thickness in the range of from 3 to 30 mm and a density of about 1610 gsm, a top side of the moldable lofted sound absorber and vibration decoupling layer being adhered to a second side of the moldable fiber backer; and
   a perforated film layer including a heat activated adhesive on opposite sides of the perforated film layer, the perforated layer having a thickness of about 0.5 mm, a plurality of perforations each having a diameter of about 380 μ and a hole density of about 30 holes/in$^2$, and an airflow resistance of approximately 900 Rayls, the perforated layer being embedded in and adhered to a location within the moldable lofted sound absorber and vibration decoupling layer to achieve a balance point between transmission loss and sound absorption.

19. The layered acoustical system of claim 18 wherein the location of the perforated film layer in the moldable lofted sound absorber and vibration decoupling layer is at a level about ½ to ⅓ the thickness of the moldable lofted sound absorber and vibration decoupling layer away from the top side of the moldable lofted sound absorber and vibration decoupling layer.

20. The layered acoustical system of claim 18 wherein the decorative layer is a tufted carpet, a needled non-woven carpet, or a nonwoven carpet with a thickness of approximately 5 mm, and an airflow resistance of approximately 80 Rayls.

* * * * *